United States Patent
Sugioka

(10) Patent No.: US 9,783,206 B2
(45) Date of Patent: Oct. 10, 2017

(54) SYSTEM AND METHOD FOR CONTROL OF AN AUTONOMOUS DRIVE RELATED OPERATION

(71) Applicant: VOLVO CAR CORPORATION, Gothenburg (SE)

(72) Inventor: Ichiro Sugioka, Newbury Park, CA (US)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 14/858,047

(22) Filed: Sep. 18, 2015

(65) Prior Publication Data

US 2016/0082976 A1    Mar. 24, 2016

(30) Foreign Application Priority Data

Sep. 24, 2014 (EP) .................................. 14186157

(51) Int. Cl.

| | |
|---|---|
| *B60W 50/10* | (2012.01) |
| *B60W 50/08* | (2012.01) |
| *B60W 50/14* | (2012.01) |
| *B60W 10/30* | (2006.01) |
| *B60W 10/04* | (2006.01) |
| *B60N 2/00* | (2006.01) |

(Continued)

(52) U.S. Cl.
CPC ............. *B60W 50/10* (2013.01); *B60N 2/002* (2013.01); *B60N 2/0244* (2013.01); *B60N 2/06* (2013.01); *B60W 50/0098* (2013.01); *G06F 3/017* (2013.01); *B60K 2350/1052* (2013.01); *B60W 2050/0095* (2013.01)

(58) Field of Classification Search
CPC ............. B60W 50/10; B60W 50/0098; B60W 2050/0095; G06F 3/017
See application file for complete search history.

(56) References Cited

U.S. PATENT DOCUMENTS 9,031,729 B2 * 5/2015 Lathrop ................ B60W 50/10 701/23
9,315,196 B2 * 4/2016 Heisterkamp ......... B60W 50/08

(Continued)

FOREIGN PATENT DOCUMENTS

| DE | 4226747 | 12/1993 |
|---|---|---|
| DE | 102011121484 | 6/2013 |
| EP | 2314489 | 4/2011 |

OTHER PUBLICATIONS

Extended European Search Report for European Application No. EP 14186157.5, Completed by the European Patent Office, Dated Mar. 13, 2015, 6 Pages.

*Primary Examiner* — Todd Melton
(74) *Attorney, Agent, or Firm* — Brooks Kushman P.C.

(57) ABSTRACT

A control system and method in a vehicle are disclosed for controlling an autonomous drive related operation of the vehicle. The method may include detecting a pre-determined foot arrangement of an occupant in a front seat of the vehicle and controlling a state of the autonomous drive related operation, based on the detected pre-determined foot arrangement. The system may include at least one sensor configured to detect a pre-determined foot arrangement of an occupant in a front seat of the vehicle, and a control unit configured to control a state of the autonomous drive related operation, based on the detected pre-determined foot arrangement.

13 Claims, 8 Drawing Sheets

(51) Int. Cl.
  *B60N 2/02*   (2006.01)
  *B60N 2/06*   (2006.01)
  *G06F 3/01*   (2006.01)
  *B60W 50/00*  (2006.01)

(56) References Cited

U.S. PATENT DOCUMENTS

2004/0122575 A1   6/2004   Marchthaler
2010/0222976 A1   9/2010   Haug
2013/0245894 A1   9/2013   Huth et al.
2014/0309878 A1*  10/2014  Ricci .................... H04W 48/04
                                                    701/36

* cited by examiner

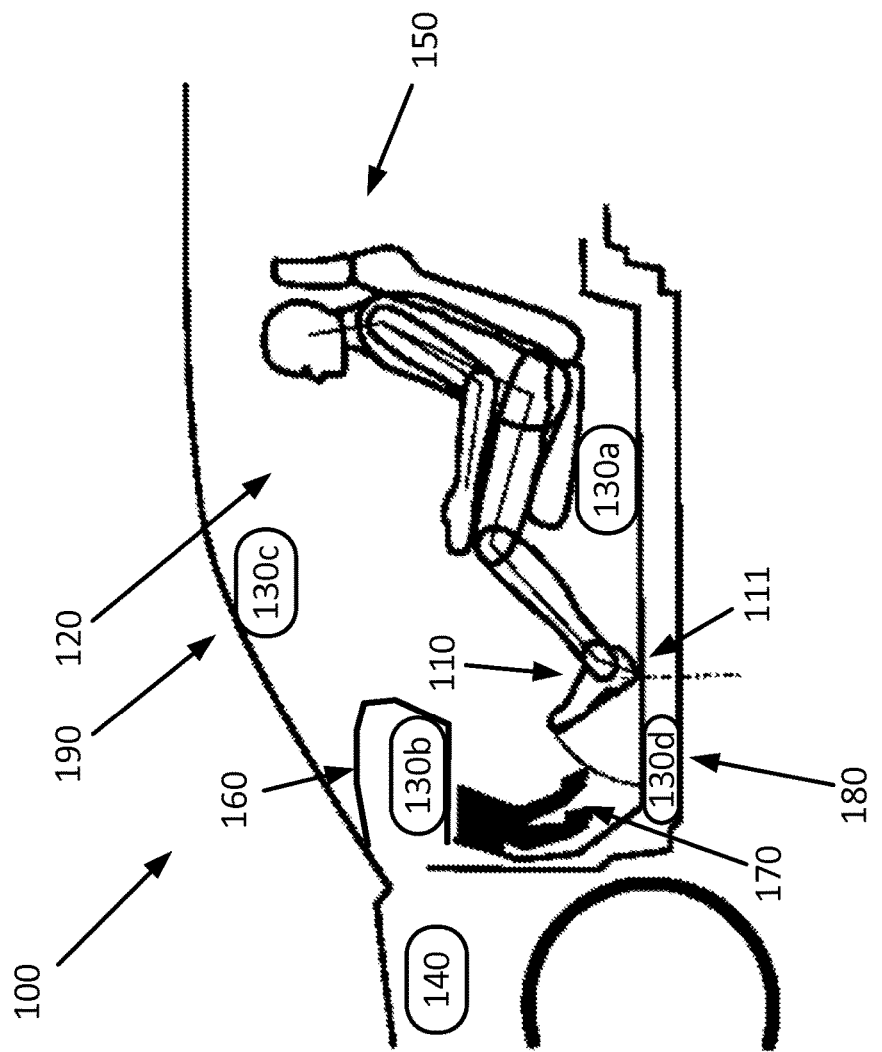

SYSTEM AND METHOD FOR CONTROL OF AN AUTONOMOUS DRIVE RELATED OPERATION

CROSS-REFERENCE TO RELATED APPLICATIONS

This application claims foreign priority benefits under 35 U.S.C. 119(a)-(d) to European patent application number EP 14186157.5, filed Sep. 24, 2014, which is incorporated by reference in its entirety.

TECHNICAL FIELD

The present disclosure relates to a control system and a method in a vehicle for controlling an autonomous drive related operation of the vehicle.

BACKGROUND

Vehicles equipped with control systems for autonomous drive are capable of travelling and interacting with other road-users without direct manual control by one or more occupants in the vehicle. These control systems may be engaged or disengaged depending on whether the occupant in the driving seat wishes to manually control, in example, to drive, the vehicle or if an autonomous driving mode is preferred. Autonomous driving, in general, comprises a plurality of different operations, where each operation is associated with one or more states.

It is of great importance that the state of an autonomous drive related operation of the vehicle is determined in a controlled manner, and in line with the intent and wishes of one or more occupants of the vehicle, thus ensuring a safe operation of the vehicle when in an autonomous driving mode. For instance, engaging or disengaging an autonomous driving mode of the vehicle should not be performed in an un-safe or otherwise unexpected manner, since this would jeopardize the safety of the one or more vehicle occupants, as well as of other road-users in the vicinity of the vehicle.

Furthermore, the vehicle occupants should have the freedom to engage in tasks not related to driving in order to provide as positive a travelling experience as possible. However, that provision should not come at the expense of reduced safety. Consequently, any actions by the vehicle should not be performed in an un-safe manner, nor should it be executed when the occupant does not expect it or wish for it.

It is an object of the present disclosure to provide solutions to, or at least mitigate, the above mentioned deficiencies in the art.

SUMMARY

An object of the present disclosure is to provide a control system and a method for controlling an autonomous drive related operation of a vehicle which seek to mitigate, alleviate, or eliminate one or more of the above-identified deficiencies.

This object is obtained by a method in a vehicle for controlling an autonomous drive related operation of the vehicle, the method comprises detecting a pre-determined foot arrangement of an occupant in a front seat of the vehicle, and controlling a state of the autonomous drive related operation based on the detected pre-determined foot arrangement. Consequently, since control of the autonomous drive related operation of the vehicle is performed based on a detected pre-determined foot arrangement of a vehicle occupant, the control may be performed in line with the expectations of the occupant, thus providing for a more secure control, as well as for increased freedom of movement for arms and feet for a more positive travelling experience for the occupant.

According to some embodiments, the autonomous drive related operation is a configuration of an interior of the vehicle. An example of a configuration of an interior of the vehicle is change in position of a front seat of the vehicle. Thus, controlling an autonomous drive related operation of the vehicle, such as configuring an interior of the vehicle to avoid inadvertent control manipulations during autonomous driving, is performed in a safe manner in-line with the expectations of the vehicle occupant.

According to some embodiments, the configuration of the interior can comprise retracting the front seat in a direction towards a back end of the vehicle such that the driver's foot is out of reach of the one or more pedals of the vehicle, or when returning the front seat in a direction towards a front end of the vehicle such that the front seat is returned to the driving position. The retracting of the front seat leads to increased room for arms and feet to perform non-driving tasks, and the returning of the front seat to the initial position allows the occupant to, for example, assume control of the vehicle.

There is also disclosed herein a computer program comprising computer program code which, when executed in a vehicle, causes the vehicle to execute a method according to any of the methods disclosed herein. Example advantages of the computer program correspond to the example advantages already described in relation to the method.

The object is also obtained by a control system in a vehicle for controlling an autonomous drive related operation of the vehicle. The control system comprises at least one sensor configured to detect a pre-determined foot arrangement of an occupant in a front seat of the vehicle, and also a control unit configured to control a state of the autonomous drive related operation, based on the detected pre-determined foot arrangement. Example advantages of the control system correspond to the example advantages already described in relation to the method.

According to some embodiments, the control unit is further configured to control a configuration of an interior of the vehicle. Thus, by controlling the configuration of an interior of the vehicle, increased comfort for the occupant is enabled without jeopardizing the safety of the occupant.

According to some embodiments, the at least one sensor comprises any one of a camera, an infra-red, IR, detector, an ultra-sound detector, and a pressure sensor. Thus, a plurality of options is provided for detecting the pre-determined foot arrangement of an occupant in a front seat of the vehicle. This leads to ease of implementation, and robustness due to the possibility to incorporate more than one type of sensor in the detecting of the pre-determined foot arrangement.

According to some further embodiments, the at least one sensor is integrated into a floor and/or a pedal of the vehicle, and/or mounted on a front side of the front seat, under a dashboard, in connection to a ceiling, and/or in connection to a vertical surface adjacent to the ceiling of the vehicle and/or an interior surface of the vehicle in which a foot arrangement of the occupant is within a field of view of the at least one sensor. Consequently, the at least one sensor may be mounted in a wide variety of locations throughout the vehicle. This leads to advantages when it comes to production of the vehicle, and also to robustness of the control system since the system may rely on sensing from more than one location in the vehicle.

In addition to the control system, there is furthermore disclosed herein a vehicle comprising the control system according to the present technique. Example advantages of this vehicle correspond to the example advantages already described in relation to the method and the control system.

BRIEF DESCRIPTION OF THE DRAWINGS

Further features, and advantages of the present disclosure will appear from the following detailed description, wherein some embodiments of the disclosure will be described in more detail with reference to the accompanying drawings, in which:

FIG. 4 shows a vehicle in which a front seat of the vehicle has been retracted rearward, according to some of the embodiments presented herein;

DETAILED DESCRIPTION

Figure 1:
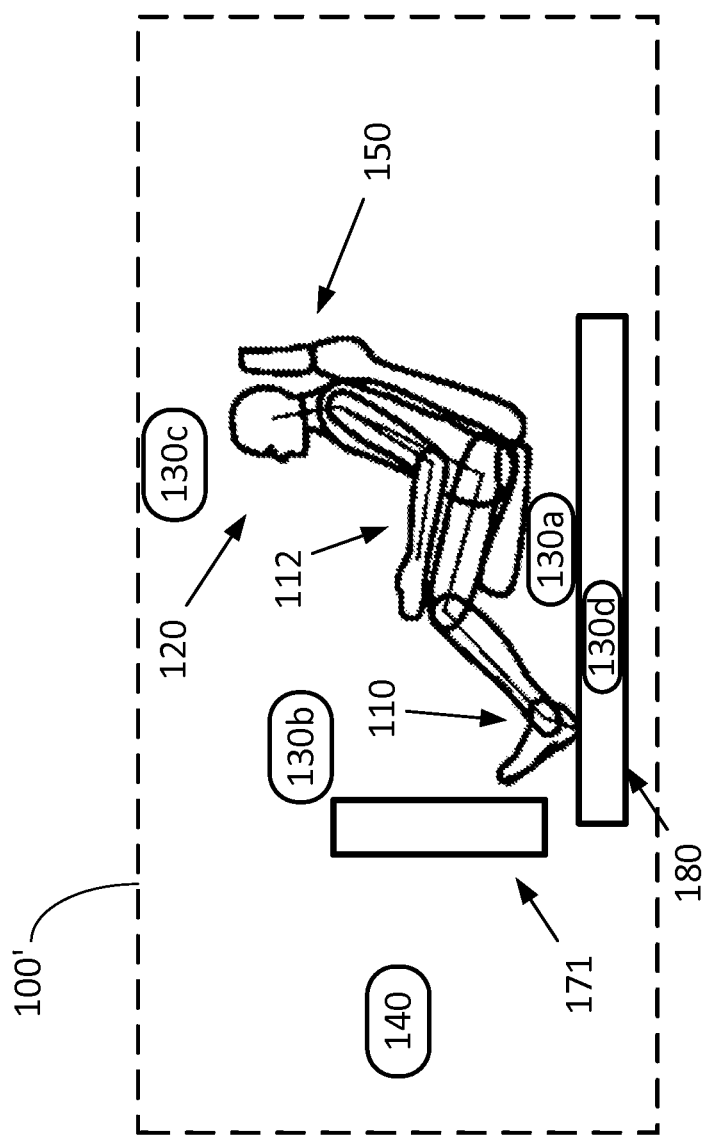
FIG. 1 shows an overview of a vehicle, according to some of the embodiments presented herein.

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Embodiments of the present disclosure will be described more fully hereinafter with reference to the accompanying drawings. The apparatus, computer program and methods disclosed herein can, however, be realized in many different forms and should not be construed as being limited to the embodiments set forth herein. Like numbers in the drawings refer to like elements throughout.

Example embodiments presented herein are directed towards a system and method of controlling an autonomous drive related operation of a vehicle based on a detection of a pre-determined foot arrangement. According to some embodiments, upon detecting a particular foot arrangement of an occupant of the vehicle, an autonomous drive related operation may be provided. Examples of such an autonomous drive related operation are the entering and exiting of an autonomous driving mode or an internal configuration of the vehicle, for example, seat retraction. The autonomous drive related operation control presented herein provides an occupant of the vehicle an opportunity to operate the vehicle in a safe manner with increased freedom of movement for arms and feet that are no longer engaged in controlling the vehicle.

The remainder of the text is organized as follows. First, an overview of a vehicle and the components of a vehicle according to the example embodiment presented herein are provided under the subheading 'Vehicle overview'. Thereafter, embodiments regarding the detection for the control of the autonomous drive related operation are provided under the subheading 'Detecting a pre-determined foot arrangement'. Examples of controlling an autonomous drive related operation based on the detection are provided under the subheading 'Controlling vehicle autonomous driving mode state' and 'Configuration of vehicle interior'. Finally, example operations which may be taken by a vehicle according to the example embodiments presented herein are provided under the subheading 'Example vehicle operations'.

Vehicle Overview

FIG. 1 shows an overview of a general vehicle 100' according to some of the embodiments presented herein. Although the present technique is discussed and illustrated below in connection to a vehicle 100 resembling a car, it is noted that the present teaching is applicable also to other types of vehicles. Consequently, the types of vehicles 100' encompassed by the present teaching comprise cars, trucks, busses and construction equipment, as well as air-planes, boats, ships, and space craft.

The vehicle 100' shown in FIG. 1 has at least one occupant 120 in a front seat 150 of the vehicle 100'. It should be appreciated that the term occupant shall be a driver of the vehicle and/or a passenger in the vehicle 100. The occupant 120 has feet 110 and at least one arm 112.

The vehicle 100' is arranged for autonomous drive related operations. In order to support controlling one or more states of the autonomous drive related operations, the vehicle 100 is equipped with one or more sensors 130a-d connected to a control unit 140 of the vehicle. A control system of the vehicle 100' then comprises at least the sensors 130a-d and the control unit 140. The sensors 130a-d may be configured to measure a position or input provided by the occupant 120.

The vehicle 100' further comprises a vehicle control device 171 configured for manual control the vehicle 100'. One example of such a vehicle control device 171 is one or more pedals of the vehicle. These one or more pedals are, according to embodiments, used to control vehicle velocity by, for example, throttle, brake, or by vehicle clutch. Another example of such a vehicle control device 171 is a primary control which, when activated, engages autonomous drive of the vehicle 100'.

Figure 2:
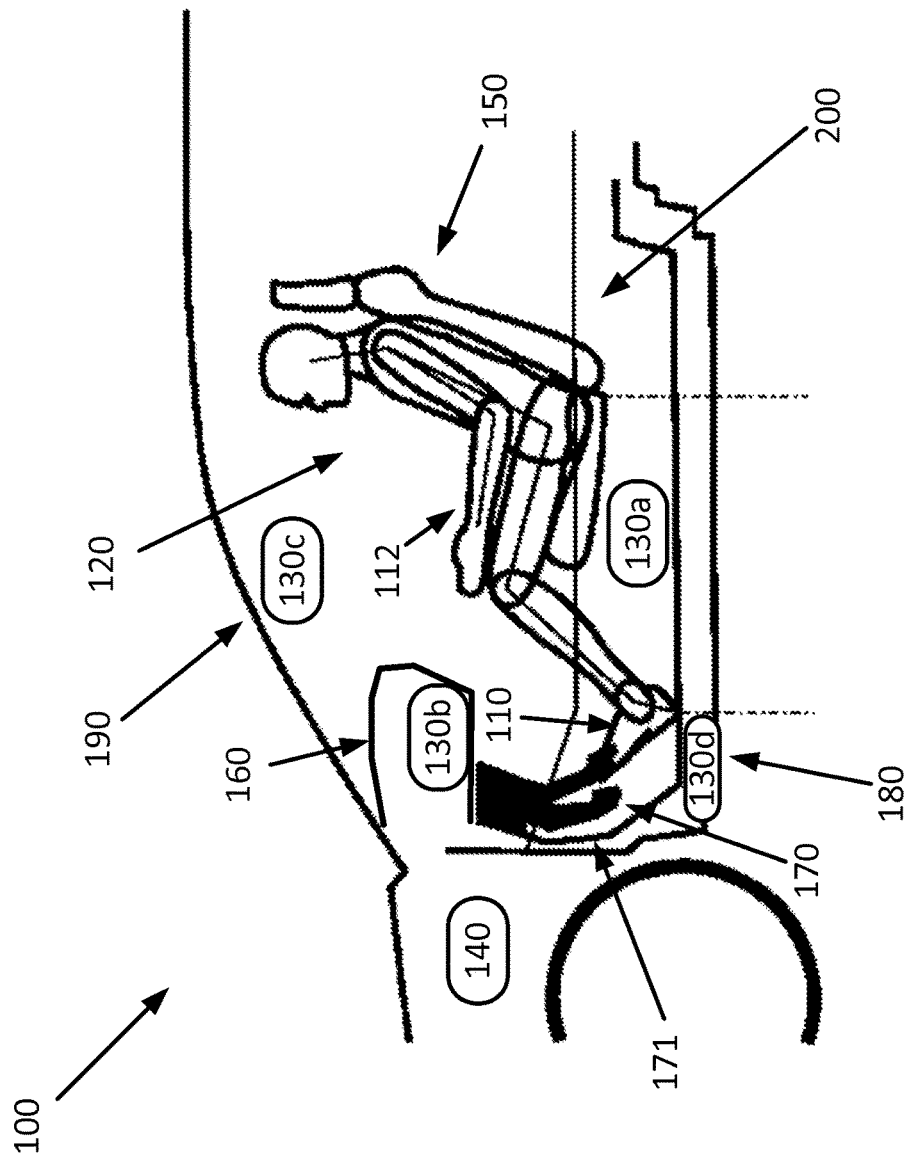
FIG. 2 shows a vehicle with an occupant arranged in a normal operating position.

FIG. 2 illustrates an example vehicle 100 in form of a car. An occupant 120 in the vehicle is arranged in a normal operating position 200. This position is suitable, in example, when having assumed manual control of the vehicle by means of the vehicle control device 171, for example, by one or more pedals 170, and/or a steering wheel of the vehicle, not shown in FIG. 2. This normal operating position 200 is configured to facilitate efficient control of the vehicle by the occupant in a safe manner, but is not necessarily configured for maximum comfort of the occupant.

The vehicle 100 shown in FIG. 2 comprises one or more sensors 130a-d. In particular, one or more sensors 130a may be mounted on a front side of the front seat 150 of the vehicle 100. The type of the sensor mounted in connection to the front seat may comprise an infra-red, IR, detector, an ultra-sound detector, and/or a camera. It should be appreciated that the sensors 130a may be mounted on any location or position within the front seat 150 such that the sensors 103*a* are capable of detecting the feet 110 or arm 112 of the occupant 120.

According to some embodiments, one or more sensors 130*b* are further mounted under a dashboard 160 of the vehicle 100, which sensors may also comprise IR detectors, ultra-sound detectors, and/or cameras. It should be appreciated that the sensors 130*b* may be mounted on any other location of the dashboard, for example, embedded in any location of the dashboard such that the sensors 130*b* are capable of detecting the feet 110 or arm 112 of the occupant 120.

According to further embodiments, one or more sensors 130*c* are mounted in connection to a ceiling 190, and/or in connection to a vertical surface adjacent to the ceiling 190 of the vehicle 100. The one or more sensors may also be mounted on any an interior surface of the vehicle in which a foot arrangement of the occupant is within a field of view of the one or more sensor. These one or more sensors may comprise IR detectors, ultra-sound detectors, and/or cameras.

According to some embodiments, the one or more sensors 130*d* are further integrated into a floor 180 and/or into a pedal 170 of the vehicle 100. Thus, there may be one or more pressure sensors 130*d* integrated in, e.g., a floor carpet of the vehicle 100.

Detecting a Pre-Determined Foot Arrangement

Figure 3:
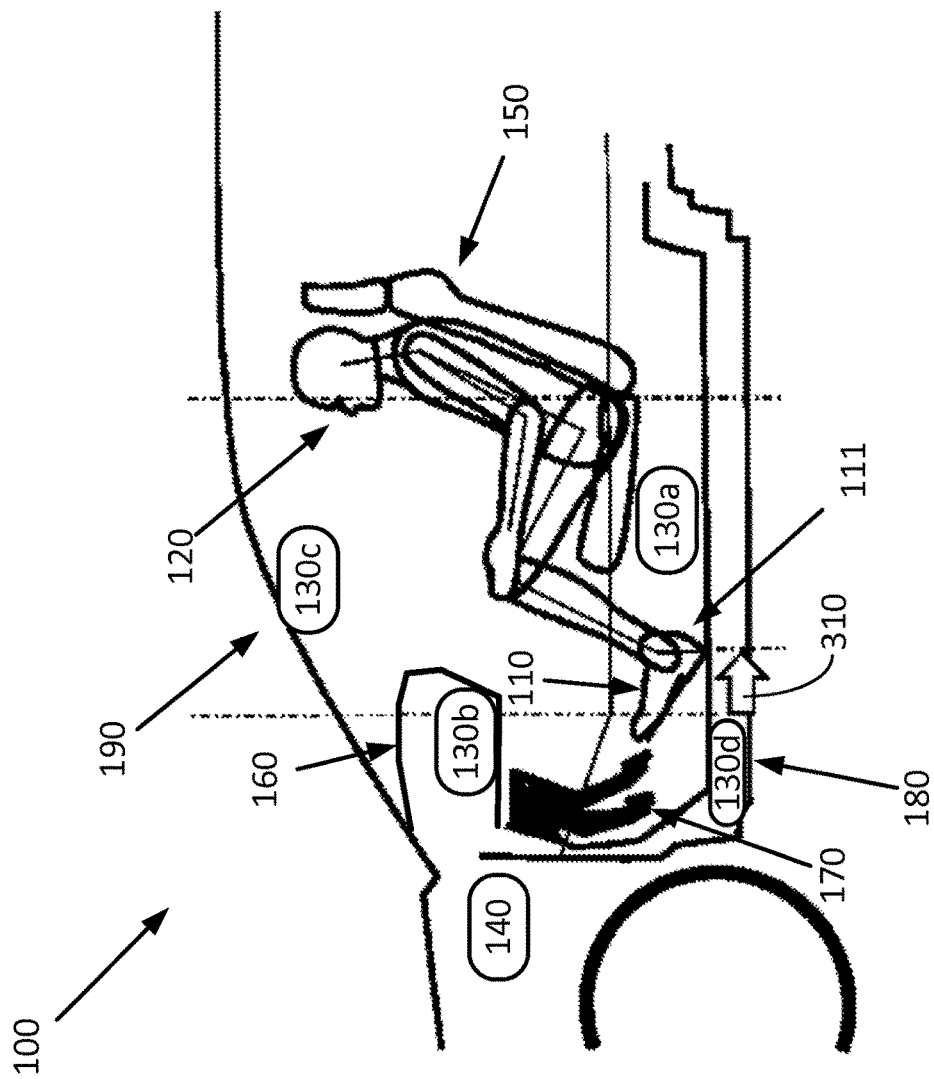
FIG. 3 illustrates detection of a predetermined foot arrangement of an occupant, according to some of the embodiments presented herein.

FIG. 3 illustrates detection of a predetermined foot arrangement of the occupant 120. According to some embodiments, the occupant 120, when wishing to control an autonomous drive related operation of the vehicle, such as, for example, engaging an autonomous driving mode of the vehicle 100 or altering a configuration of an interior of the vehicle, arranges his feet in accordance with a pre-determined foot arrangement 111.

The example of FIG. 3 illustrates an arrangement in which the feet 110 have been moved 310 from the one or more pedals 170 to a position aft of the pedals. This pre-determined foot arrangement 111 is detected by the control unit 140 using sensor signals supplied to the control unit 140 by one or more of the above-mentioned sensors 130*a-d*.

In this way, an autonomous drive related operation of the vehicle 100 is controlled by detecting a pre-determined foot arrangement 111 of an occupant 120 in a front seat 150 of the vehicle, and controlling a state of the autonomous drive related operation, based on the detected pre-determined foot arrangement 111.

Thus, the actual detecting of the pre-determined foot arrangement is achieved by sensing of the feet 110 of the occupant 120, by means of one or more of the above-mentioned sensors 130*a-d*. The actual definition of the pre-determined foot-arrangement, however, differs between different embodiments of the present teaching, as will now be exemplified.

For instance, in one example, a pre-determined foot arrangement is defined as a foot arrangement in which the feet 110 are located beyond a certain minimum distance from the one or more pedals 170. This type of pre-determined foot arrangement is detected by sensing a distance between the feet 110 of the occupant 120 and the one or more pedals 170 of the vehicle 100, 100', followed by comparison of the sensed distance to a pre-determined distance threshold.

Another example involves defining a pre-determined zone, i.e., a three-dimensional volume, in the vehicle 100, 100'. If the feet 110 of the occupant 120 are located within this pre-determined zone, then the feet are located according to the pre-determined foot arrangement. This type of pre-determined foot arrangement is detected by means of sensing if both feet 110 of the occupant 120 are located in the pre-determined zone in the vehicle 100, 100'.

Yet another example relates to how the occupant moves the feet 110 over a pre-determined time duration. A pre-determined foot arrangement is thus detected by sensing a motion of the feet 110 of the occupant 120 over the pre-determined time duration, and comparing this sensed motion to a pre-determined motion pattern. An example of this type of pre-determined foot arrangement will be discussed in connection to FIG. 7 below, where a panic reaction of the occupant 120 is described.

Controlling Vehicle Autonomous Driving Mode State

One example of said autonomous drive related operation of the vehicle is engaging or disengaging autonomous drive of the vehicle. When autonomous drive is engaged, the vehicle assumes control, while, during periods of disengaged autonomous drive, the occupant 120 of the vehicle assumes manual control of the vehicle.

According to some embodiments, autonomous drive of the vehicle 100, 100' is engaged or disengaged by a primary control unit, such as an electrical switch or voice command system. This primary control unit may of course be activated by mistake but the manual controls system continues to function so occupant retains the ability to control the vehicle. In order to disengage an autonomous driving mode and provide an additional level of control, detection of the pre-determined foot arrangement in a position near the pedals may be used as a secondary complementary control unit for disengaging autonomous drive of the vehicle. Thus, according to an example operation of the vehicle 100, 100', autonomous drive of the vehicle is arranged to be disengaged by first activating a primary control unit, followed by arranging feet 110 of an occupant 120 according to a pre-determined foot arrangement where the feet of the occupant are at the proper position on the floor, for example, position 111 in FIGS. 7*b* and 7*c*, for the driver to return to manual driving position.

In this way, autonomous drive of the vehicle 100, 100' may be disengaged on condition that both the primary and secondary control units are activated. Thus, detecting the pre-determined foot arrangement, according to some embodiments, constitutes one of at least two conditions for the controlling of the autonomous drive related operation of the vehicle 100, 100'.

According to further embodiments, if an occupant of the vehicle 100, 100' activates said primary control, but fails to arrange feet 110 according to the pre-determined foot arrangement, then the vehicle will issue an alert signal when detection of the pre-determined foot arrangement does not occur within a pre-determined time duration measured from a time instant when at least one other condition, such as the activation of the primary control, out of the at least two conditions is fulfilled. The occupant is thus notified of the reason why the manual drive operation fails to commence. It should be appreciated that the detection of the pre-determined foot arrangement may also serve as a primary activation while the engagement of a control unit may serve as a secondary activation.

Configuration of Vehicle Interior

According to some embodiments of the present teaching, the autonomous drive related operation of the vehicle comprises a configuration of an interior of the vehicle. Thus, the interior of the vehicle is configured according to the state of the autonomous drive related operation of the vehicle. This configuration, according to some embodiments, comprises displacing the front seat 150 of the vehicle 100 in order to provide for a more positive travelling experience, for example, by allowing an occupant to engage in activities that would normally not be possible during a manual driving mode.

A configuration of the vehicle interior in which the front seat 150 has been retracted in order to, e.g., provide for more legroom of the occupant 150 is shown in FIG. 4. Here, the heels of the feet 110 are located on the floor 180 of the vehicle where they were placed prior to retraction of the front seat 150. In this position the toes of the feet 110 are not in a position to contact the one or more pedals 170, shown in FIG. 4 by an arc extending from the feet 110.

Additionally, the configuration of the vehicle interior in which the front seat 150 has been retracted leads to increased safety in that the occupant cannot inadvertently active controls of the vehicle, such as the one or more pedals, e.g., by moving the front seat rearward to the refracted position. Thus, the comfort and safety of the vehicle occupant is increased, providing for a more positive and safe travelling experience. However, seat retraction is only executed following a detection of the pre-determined foot arrangement 111, thus, seat retraction is not executed in a manner unexpected by the occupant 120 of the front seat 150 of the vehicle 100, 100'. Controlling the configuration of the vehicle interior is thus, by the present teaching, executed in a secure fashion, without causing injury or danger to the occupant 120 of the vehicle.

In some vehicle operation scenarios it makes little sense to retract the front seat of an occupant 120 driving the vehicle 100 when autonomous drive is not engaged. Accordingly, in some scenarios, the configuring of vehicle interior requires prior engagement of an autonomous driving mode of the vehicle 100, 100'. Thus, a driver seat of the vehicle 100 is only refracted when autonomous drive is engaged. A passenger seat can, however, be retracted more freely, i.e., regardless of whether autonomous drive is engaged or not.

Figure 5A:
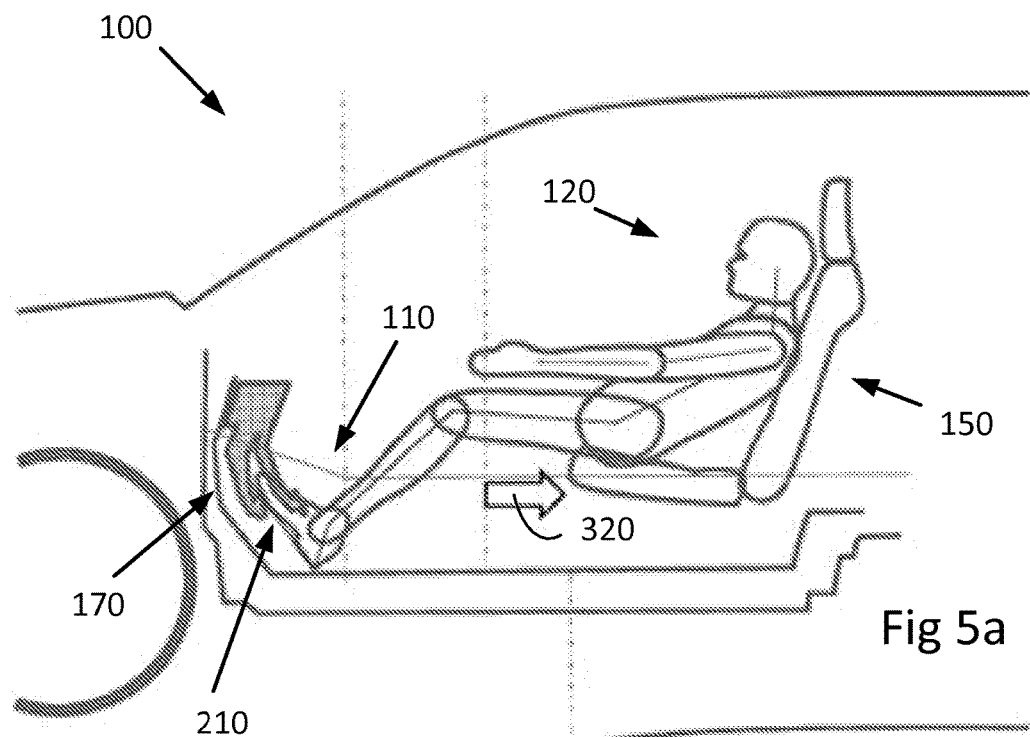
FIGS. 5a and 5b illustrate potential problems in retracting a front seat of a vehicle, according to some of the embodiments presented herein.
Figure 5B:
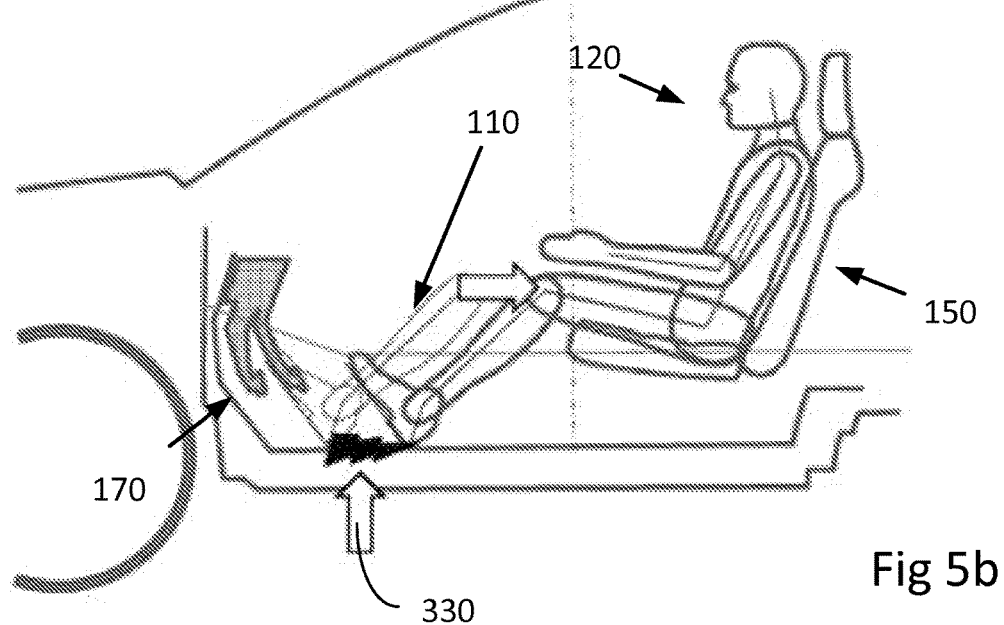

FIGS. 5a and 5b illustrate some example un-wanted scenarios which are avoided by application of the present technique of controlling a configuration of an interior of the vehicle. FIG. 5a illustrates an example scenario in which the vehicle interior has been reconfigured by refraction 320 of the front seat 150, without first ensuring that the feet 110 of the occupant 120 are free of the one or more pedals 170. Thus, the feet 110 have become stuck 210 under or in connection to the one or more pedals 170, causing injury or at least discomfort for the occupant 120.

FIG. 5b illustrates an example scenario in which the vehicle interior has been reconfigured by retraction of the front seat 150, without first ensuring that the heels of the feet 110 of the occupant 120 have been refracted. Thus, when the front seat 150 is retracted the heels may be dragged 330 on the floor 180 of the vehicle 100. The advantage of the example embodiments presented herein is to ensure that the feet are in a proper position during the retraction of the seat, as such, the dragging of the occupant's heels may be avoided.

If the occupant 120 wishes to resume manual control of the vehicle 100, or if an end to the autonomous driving mode of the vehicle is expected, then the front seat 150 should be returned to the initial position. For example, this may happen because the vehicle is about to leave a certified autonomous driving road or zone. Another example is that a crash or another hazard situation requiring the driver to take control is about to occur. A passenger in the vehicle 100 may also, for such reasons, want the passenger side front seat to be returned to the initial position.

Figure 6A:
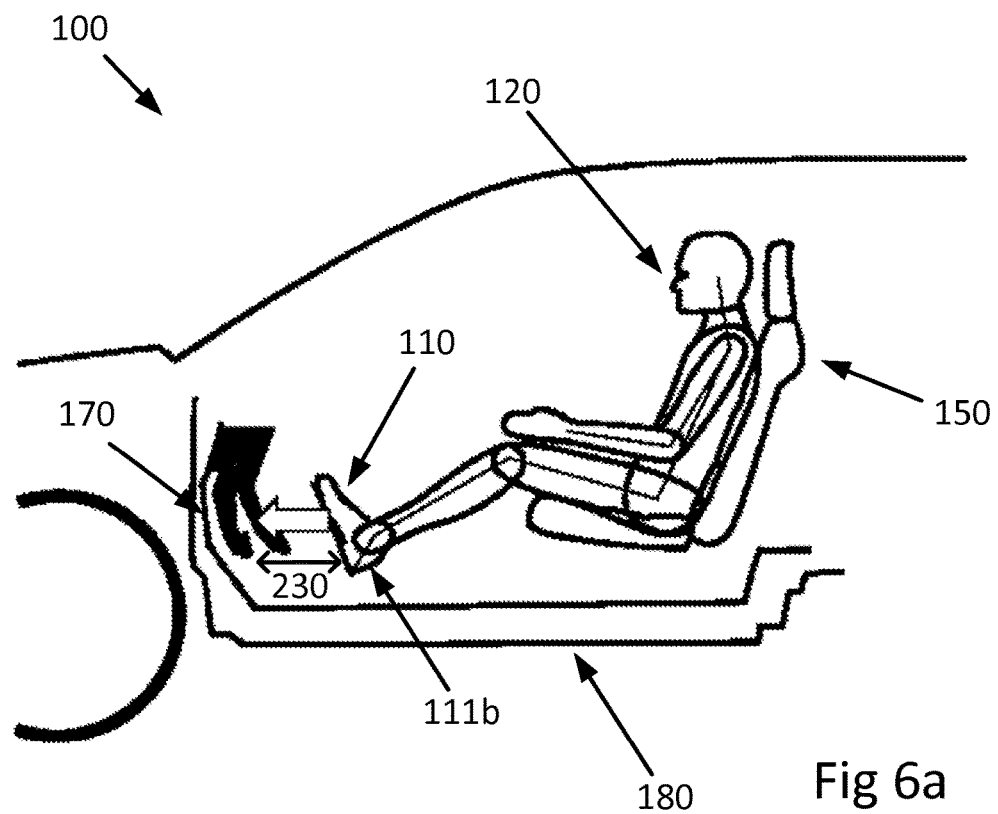
FIGS. 6a and 6b illustrate potential problems in returning a front seat of a vehicle to an initial position.
Figure 6B:
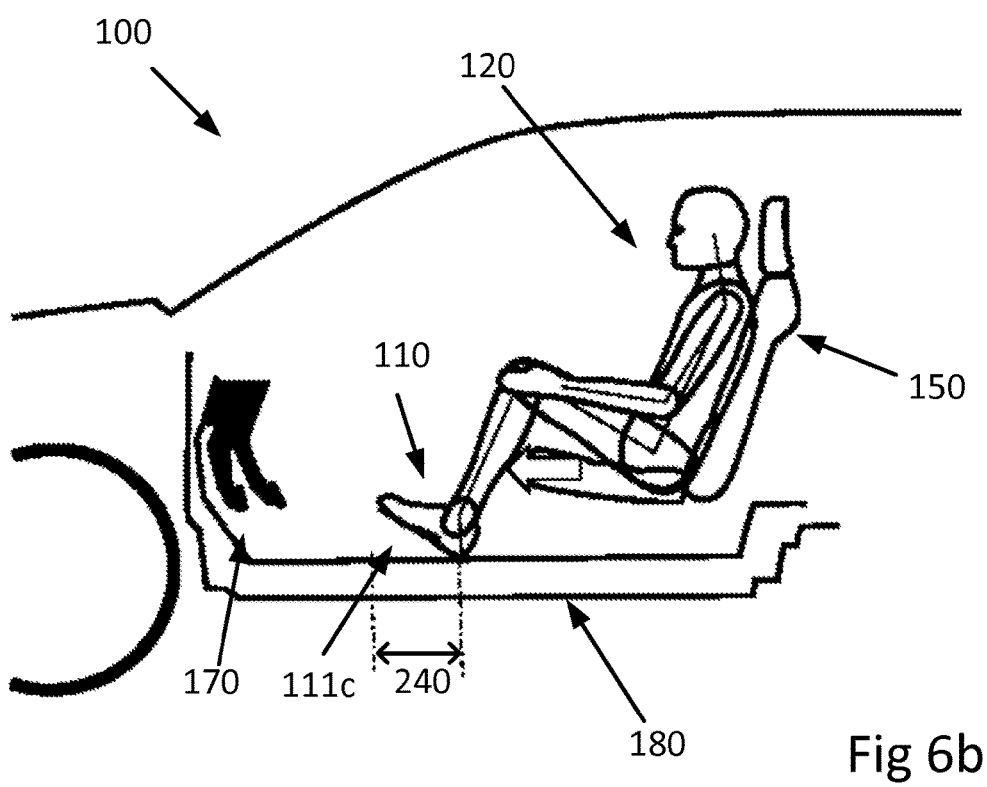

When there is reason to return the front seat 150 to the initial position, i.e., to a position where the occupant may assume the normal operating position 200, certain pre-determined foot-arrangements are preferred for the occupant 120 when the front seat 150 is returned to the forward position. FIGS. 6a and 6b illustrate two example pre-determined foot arrangements which are not preferred.

FIG. 6a illustrates an example scenario with a pre-determined foot arrangement 111b in which the feet 110 of the occupant are located within a zone 230 such as to potentially contact and push the one or more pedals 170 upon returning the front seat 150 to the initial position, as shown in FIG. 2. FIG. 6b illustrates another example scenario with a pre-determined foot arrangement 111c in which the feet 110 of the occupant 120 are positioned within a zone 240 right in front of the front seat 150. Thus, should the front seat 150 be returned under the circumstances illustrated in either of FIG. 6a or 6b, the feet 110 would be pushed over the floor 180 of the vehicle, or stuck under the front seat 150.

Thus, detecting an undesired foot arrangement 111b, 111c of an occupant 120 in a front seat 150 of the vehicle 100, 100', according to some embodiments, results in a deferral of a vehicle interior configuration. Since, had a vehicle interior configuration been executed, harm or discomfort would have been inflicted on the occupant 120. According to some embodiments, a warning or indication for the occupant 120 to correct the current foot arrangement may be given following a deferral of a vehicle interior configuration.

Figure 7A:
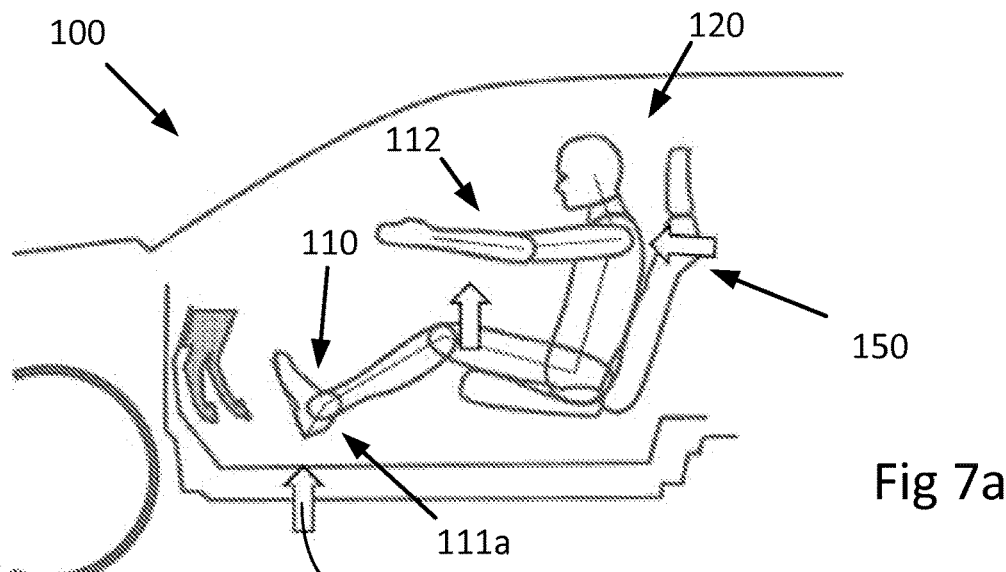
FIGS. 7a-7c illustrate a panic gesture by an occupant in a vehicle, according to some of the embodiments presented herein.
Figure 7B:
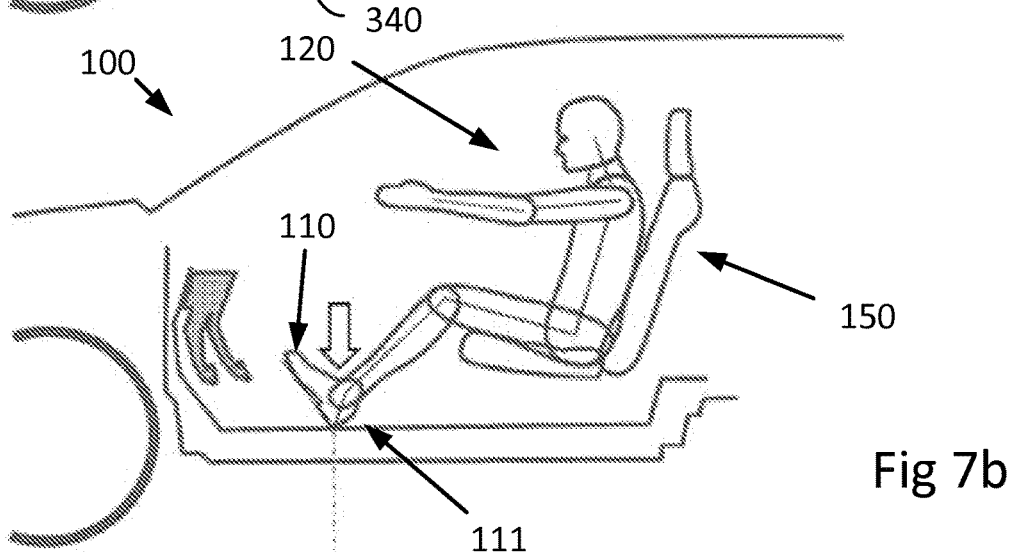
Figure 7C:
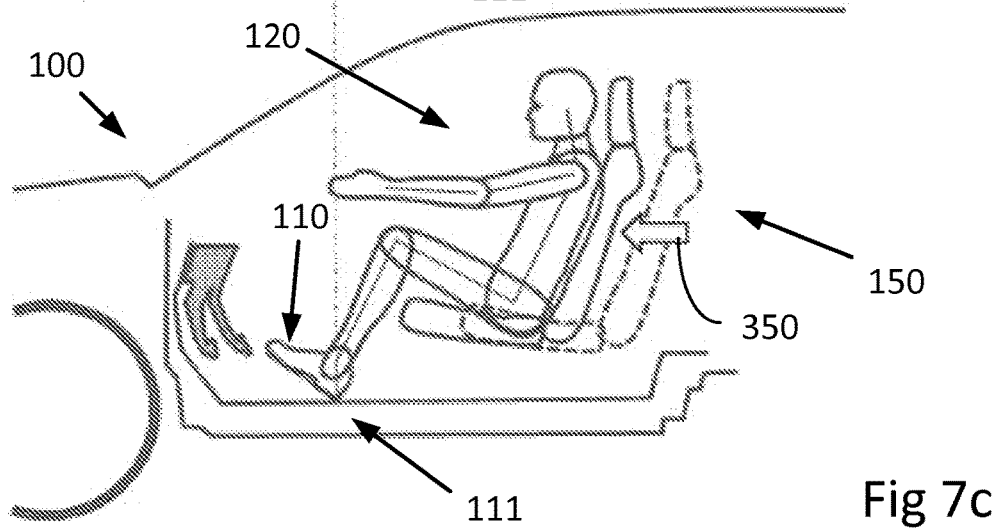

FIGS. 7a-7c illustrate an example sequence of events which, according to embodiments of the present teaching, results in a configuration of the vehicle interior such that the front seat 150 is returned to the initial position, and furthermore, according to some other embodiments, also results in a disengagement of autonomous drive of the vehicle 100.

In the sequence of events illustrated in FIGS. 7a-7c, the occupant 120 notices a danger, or is otherwise prompted to resume manual control of the vehicle 100. The occupant 120 therefore reaches for one or more control devices of the vehicle 100, such as, e.g., a steering wheel, not shown in FIGS. 7a-7c, or the one or more pedals 170 of the vehicle. One example of this reaching is a panic gesture by the occupant 120. During reaching for the one or more control devices of the vehicle, an arm 112 of the occupant is outstretched, and the torso of the occupant is moved in a forward direction, i.e., towards the one or more control devices of the vehicle. This reaching is illustrated in FIG. 7a. Furthermore, according to some embodiments, the feet 110 are lifted off the floor of the vehicle 100. Following the reaction shown in FIG. 7a, the feet 110 of the occupant are then, as illustrated in FIG. 7b, returned to the floor of the vehicle within a pre-determined area or zone, avoiding contact with the one or more pedals, whereupon a pre-determined feet arrangement 111 is detected and the front seat 150 is returned to the initial position, as illustrated in FIG. 2.

Thus, according to embodiments of the present teaching, the vehicle 100, 100' is configured to detect an attempted engagement of the occupant 120 with a control device of the vehicle 100, 100', such as a steering wheel or the one or more pedals 170. The vehicle is furthermore configured to return the front seat 150 in a direction towards a front end of the vehicle when both feet 110 of the occupant 120 are located in a pre-determined zone in the vehicle 100, 100'.

According to further embodiments, if an occupant of the vehicle 100, 100' activates said primary control, but fails to arrange feet 110 according to the pre-determined foot arrangement, then the vehicle will issue an alert signal when detection of the pre-determined foot arrangement does not occur within a pre-determined time duration measured from a time instant when at least one other condition, such as the activation of the primary control, out of the at least two conditions is fulfilled. The occupant is thus notified of the reason why the autonomous drive related operation fails to commence. It should be appreciated that the detection of the pre-determined foot arrangement may also serve as a primary activation while the engagement of a control unit may serve as a secondary activation.

Example Vehicle Operations

Figure 8:
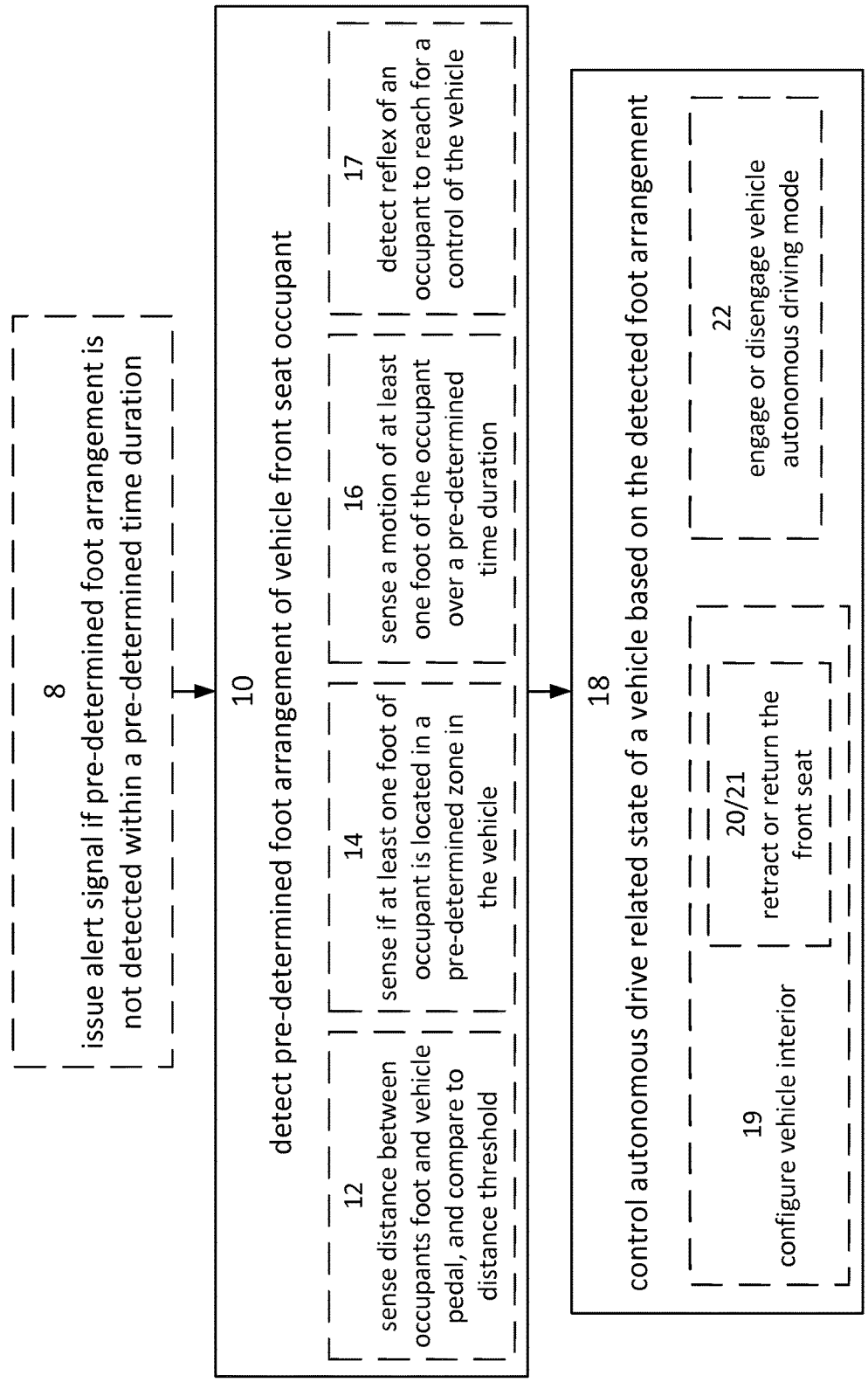
FIG. 8 is a flowchart illustrating embodiments of example operations which may be performed in a vehicle, according to some of the embodiments presented herein.

FIG. 8 is a flow diagram depicting example method steps, performed in a vehicle 100, 100' substantially as described herein, for controlling an autonomous drive related operation of the vehicle 100, 100'. It should be appreciated that FIG. 8 comprises some operations which are illustrated with solid border, and some operations which are illustrated with a dashed border. The operations which are comprised in a solid border are operations which are comprised in the broadest embodiment of the present teaching. The operations which are comprised in a dashed border are example embodiments which may be comprised in, or a part of, or are further operations which may be taken in addition to the operations of the broader example embodiments. It should furthermore be appreciated that the operations need not be performed in order.

Example Operation 8

According to some embodiments, the vehicle 100, 100' is configured to issue 8 an alert signal when a detection of a predetermined foot arrangement does not occur within a pre-determined time duration measured from a time instant when at least one other condition out of the at least two conditions is fulfilled. The control unit 140 discussed above, e.g., in relation to FIG. 1, is configured to issue the alert signal when the detecting does not occur within a pre-determined time duration measured from the time instant when at least one other condition out of the at least two conditions is fulfilled.

As explained above in relation to at least FIG. 2, and under subheading 'Controlling vehicle autonomous driving mode state', the issuing of such an alert is helpful in order to notify the occupant of the reason an autonomous drive related operation fails to commence.

Operation 10

The vehicle 100, 100' is configured to detect 10 a pre-determined foot arrangement 111 of an occupant 120 in a front seat 150 of the vehicle 100, 100'. The control unit 140 is configured to detect the pre-determined foot arrangement 111 based on input signals from the one or more sensors 130a-130d comprised in the vehicle 100. Operation 10 is discussed above in connection to at least FIG. 2 and under subheading 'Vehicle overview'. Some examples of different pre-determined foot arrangements have been discussed in connection to FIGS. 3, 6a, 6b, and 7a-7c above.

As noted above, the detection of the pre-determined foot arrangement of the occupant 120 enables controlling an autonomous drive related operation of the vehicle in line with expectations of the occupant, thus providing for a more secure control, as well as for increased comfort leading to a more positive travelling experience for the occupant.

Example Operation 12

According to some embodiments, the vehicle 100, 100' is configured to sense 12 a distance between the feet 110 of the occupant 120 and one or more pedals 170 of the vehicle 100, 100', and compare the distance to a pre-determined distance threshold. One or more out of the one or more sensors 130a-d comprised in the vehicle 100 and discussed above in connection to at least FIG. 2, and under subheading 'Vehicle overview', is arranged to sense the distance between the feet 110 of the occupant 120 and one or more pedals 170 of the vehicle 100, 100'. The control unit 140 is then configured to compare the distance to the pre-determined distance threshold. Having access to information about the distance between the feet and the one or more pedals 170 may be used by the vehicle to secure that the feet cannot get stuck under the pedals of the vehicle upon retracting the front seat, as discussed in connection to FIG. 5a above. Having access to information about the distance between the feet and the one or more pedals 170 is also helpful in order to determine if the front seat 150 can be safely returned to the initial position as discussed in connection to FIGS. 6a and 6b.

Example Operation 14

According to some further embodiments, the vehicle 100, 100' is configured to sense 14 if both feet 110 of the occupant 120 are located in a pre-determined zone in the vehicle 100, 100'. As for the sensing of the distance, one or more out of the one or more sensors 130a-d comprised in the vehicle 100 and discussed above in connection to at least FIG. 3, and under subheading 'Detecting a pre-determined foot arrangement', is arranged to sense if both feet 110 of the occupant 120 are located in a pre-determined zone in the vehicle 100, 100', and to communicate this sensed data to the control unit 140.

Information related to the location of the feet in a pre-determined zone in the vehicle 100, 100' is one way of securing that the front seat can be retracted without causing discomfort or injury to the occupant, as discussed in connection to at least FIGS. 5a and 5b above. Knowledge of whether both feet 110 of the occupant 120 are located in the pre-determined zone in the vehicle 100, 100' is also useful in securing that the front seat 150 can be returned to initial position without, e.g., the feet getting stuck under the front seat or accidentally contacting the one or more pedals 170 of the vehicle 100, as was discussed above in connection to FIGS. 6a and 6b.

Example Operation 16

According to some other embodiments, the vehicle 100, 100' is configured to sense 16 a motion of the feet 110 of the occupant 120 over a pre-determined time duration, and to compare the motion to a pre-determined motion pattern during said time duration. Again, one or more out of the one or more sensors 130a-d comprised in the vehicle 100 and discussed above in connection to at least FIG. 3, and under subheading 'Detecting a pre-determined foot arrangement', is arranged to sense the motion of the feet 110 of the occupant 120 over the pre-determined time duration, and to communicate this sensed data to the control unit 140. The control unit 140 is then arranged to compare the motion to a pre-determined motion pattern during said time duration.

One example of this motion of the feet was discussed above in connection to FIG. 7, where a panic gesture of the occupant was detected, which detection triggered a returning of the front seat 150 to initial position.

Example Operation 17

According to some further embodiments, the vehicle 100, 100' is configured to detect 17 an attempted engagement of the occupant 120 with a control device of the vehicle 100, 100', in which case the vehicle is further configured to return 20 the front seat 150 in a direction towards a front end of the vehicle 100, 100' when both feet 110 of the occupant 120 are located in a pre-determined zone in the vehicle 100, 100'. The one or more sensors 130a-130d are configured to detect this attempted engagement of the occupant 120 with a control device of the vehicle 100, 100'. The control unit 140 is configured to receive sensor data from the one or more sensors 130a-130d related to the attempted engagement, and to return the front seat 150 in a direction towards a front end of the vehicle 100, 100' when both feet 110 of the occupant 120 are located in a pre-determined zone in the vehicle 100, 100'.

The attempted engagement of the occupant was exemplified in connection to FIGS. 7a-7c above, where a panic gesture of the occupant 120 was discussed.

Operation 18

The vehicle is further configured to control 18 a state of the autonomous drive related operation, based on the detected pre-determined foot arrangement 111. The control unit 140 is configured to perform the controlling, based on sensor data received from the one or more sensors 130a-d comprised in the vehicle 100, 100'. The controlling was discussed above under at least the subheading 'Controlling vehicle autonomous driving mode'.

Since control of the autonomous drive related operation of the vehicle is performed based on a detected pre-determined foot arrangement of a vehicle occupant, the control may be performed in line with the expectations of the occupant, thus providing for a more secure control, as well as for increased comfort and a more positive travelling experience for the occupant.

According to embodiments, detection of the pre-determined foot arrangement 111, as discussed in relation to operation 10, may constitute one of at least two conditions for the controlling 18 discussed above. Thus, as mentioned above under at least the subheading 'Controlling vehicle autonomous driving mode state', detection of the pre-determined foot arrangement, may be used as a secondary complementary control unit for, e.g., disengaging autonomous drive of the vehicle or seat refraction. This is helpful in order to provide an additional degree of control of, e.g., an autonomous drive mode of the vehicle 100.

Example Operation 19

According to embodiments, the vehicle 100, 100' is further arranged to configure 19 an interior of the vehicle 100, 100' as part of controlling 18 the state of the autonomous drive related operation. The configuring of the interior is performed by the control unit 140 based on sensor data received from the one or more sensors 130a-d. The configuring of vehicle interior was discussed above under at least subheading 'Configuration of vehicle interior'.

Example Operation 20

According to embodiments, the vehicle 100, 100' is further configured to retract 20 the front seat 150 in a direction towards a back end of the vehicle 100, 100' such that the occupant 120 is out of reach of the one or more pedals 170 of the vehicle 100, 100'. The control unit 140 is configured to retract the front seat, which retracting of the front seat was discussed above under at least the subheading 'Configuration of vehicle interior'.

The retracting of the front seat leads to increased room for occupant feet and arms, and the returning of the front seat to the initial position allows the occupant to, for example, assume control of the vehicle. Thus, increased comfort is provided without jeopardizing occupant safety.

Example Operation 21

According to embodiments, the vehicle 100, 100' is further arranged to return 21 the front seat 150 in a direction towards a front end of the vehicle 100, 100' when both feet 110 of the occupant 120 are located in a pre-determined zone in the vehicle 100, 100', as part of controlling 18 the state of the autonomous drive related operation. The front seat 150 is returned a direction towards a front end of the vehicle 100, 100' such that the front seat is in an initial position. The control unit 140 is configured to return the front seat. The returning of the front seat is further discussed above under at least the subheading 'Configuration of vehicle interior'.

Example Operation 22

According to some further embodiments, the vehicle 100, 100' is configured to engage or disengage an autonomous driving mode of the vehicle 100, 100'. Thus, as was stated above under at least the subheading 'Vehicle overview', the vehicle 100' is arranged for autonomous drive related operations.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware and/or software. In that regard, the control unit or units described herein may comprise one or more microprocessors, microcontrollers, programmable digital signal processors (DSP) or other programmable devices. The control unit may also, or instead, include one or more application specific integrated circuits (ASIC), programmable gate arrays or programmable array logic, programmable logic devices, or digital signal processors. Where the control unit comprises a programmable device such as a microprocessor, microcontroller or programmable digital signal processor, the control unit may also comprise a memory unit which may store computer executable instructions that control operation of the programmable device and/or for performing the various operations and/or functions described herein.

The various example embodiments described herein are described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method in a vehicle for controlling an autonomous drive related operation of the vehicle, the method comprising:
    detecting a pre-determined foot arrangement of an occupant in a front seat of the vehicle; and
    controlling a state of the autonomous drive related operation, based on the detected pre-determined foot arrangement, wherein controlling comprises configuring an interior of the vehicle by controlling movement of the front seat.

2. The method according to claim 1 wherein the detecting comprises any of:
    sensing a distance between the feet of the occupant and one or more pedals of the vehicle, and comparing the distance to a pre-determined distance threshold;
    sensing if both feet of the occupant are located in a pre-determined zone in the vehicle; and
    sensing a motion of the feet of the occupant over a pre-determined time duration, and comparing the motion to a pre-determined motion pattern during said time duration.

3. The method according to claim 1 wherein controlling comprises retracting the front seat in a direction towards a back end of the vehicle such that the occupant is out of reach of the one or more pedals of the vehicle, or returning the front seat in a direction towards a front end of the vehicle such that the front seat is in an initial position.

4. The method according to claim 1 wherein controlling comprises engaging or disengaging an autonomous driving mode of the vehicle.

5. The method according to claim 1 wherein detecting the pre-determined foot arrangement constitutes one of at least two conditions for controlling.

6. The method according to claim 5 further comprising issuing an alert signal when the detecting does not occur within a pre-determined time duration measured from a time instant when at least one other condition out of the at least two conditions is fulfilled.

7. The method according to claim 1 wherein detecting comprises detecting an attempted engagement of the occupant with a control device of the vehicle, and wherein controlling comprises returning the front seat in a direction towards a front end of the vehicle when both feet of the occupant are located in a pre-determined zone in the vehicle.

8. A non-transitory computer readable medium comprising stored computer executable program code, the program code for execution by a control unit in a vehicle to:
    detect a pre-determined foot arrangement of an occupant in a front seat of the vehicle; and
    control a state of the autonomous drive related operation, based on the detected pre-determined foot arrangement, wherein the control comprises configuration of an interior of the vehicle by control of movement of the front seat.

9. A control system in a vehicle for controlling an autonomous drive related operation of the vehicle, the control system comprising:
    at least one sensor configured to detect a pre-determined foot arrangement of an occupant in a front seat of the vehicle; and
    a control unit configured to control a state of the autonomous drive related operation, based on the detected pre-determined foot arrangement, wherein the control unit is further configured to control configuration of an interior of the vehicle by control of movement of the front seat.

10. The control system according to claim 9 wherein the at least one sensor comprises any one of a camera, an infra-red, IR, detector, an ultra-sound detector, and a pressure sensor.

11. The control system according to claim 9 wherein the at least one sensor is integrated into a floor and/or into one or more pedals of the vehicle, and/or mounted on a front side of the front seat, under a dashboard, in connection to a ceiling, in connection to a vertical surface adjacent to the ceiling of the vehicle, and/or an interior surface of the vehicle in which a foot arrangement of the occupant is within a field of view of the at least one sensor.

12. The control system according to claim 9 wherein the state of the autonomous drive related operation comprises any of engaging an autonomous driving mode of the vehicle, disengaging an autonomous driving mode of the vehicle, retraction of the front seat in a direction towards a back end of the vehicle such that the occupant is out of reach of at least one of the one or more pedals of the vehicle, and returning of the front seat in a direction towards a front end of the vehicle such that the front seat is in an initial position.

13. A vehicle comprising the control system according to claim 9.

* * * * *